United States Patent
Fitz et al.

(10) Patent No.: US 7,100,907 B2
(45) Date of Patent: Sep. 5, 2006

(54) BRAKING- AND DAMPING DEVICE, IN PARTICULAR FOR MOVABLE PIECES OF FURNITURE

(75) Inventors: Helmut Fitz, Lustenau (AT); Klaus Brüstle, Höchst (AT)

(73) Assignee: Julius Blum Gesellschaft m.b.H., Höchst (AT)

(*) Notice: Subject to any disclaimer, the term of this patent is extended or adjusted under 35 U.S.C. 154(b) by 462 days.

(21) Appl. No.: 10/038,910

(22) Filed: Jan. 8, 2002

(65) Prior Publication Data

US 2002/0088677 A1    Jul. 11, 2002

(30) Foreign Application Priority Data

Jan. 9, 2001  (AT) ............................... GM14/2001
Apr. 12, 2001 (AT) ............................... A 591/2001

(51) Int. Cl.
    *F16F 9/14* (2006.01)

(52) U.S. Cl. .................... 267/64.15; 188/271; 267/201

(58) Field of Classification Search ............ 267/201 X, 267/219, 64.11, 64.15, 64.28, 226, 293, 292; 188/271, 272; 312/327, 328, 319.8
    See application file for complete search history.

(56) References Cited

U.S. PATENT DOCUMENTS

| | | | |
|---|---|---|---|
| 2,646,859 A | 7/1953 | Read et al. | |
| 2,705,634 A | 4/1955 | Sampson et al. | |
| 3,628,637 A | 12/1971 | Axthammer | |
| 3,806,105 A * | 4/1974 | Konishi et al. | 267/116 |
| 3,904,226 A * | 9/1975 | Smalley | 280/486 |
| 4,010,940 A * | 3/1977 | Freyler | 267/201 |
| 4,085,832 A * | 4/1978 | Gaines et al. | 188/268 |
| 4,166,522 A | 9/1979 | Bourcier de Carbon | |
| 4,613,114 A | 9/1986 | Paton | |
| 5,174,603 A * | 12/1992 | Lund | 188/266.2 |
| 5,257,680 A * | 11/1993 | Corcoran et al. | 188/129 |
| 5,375,823 A * | 12/1994 | Navas | 623/17.15 |
| 5,549,182 A | 8/1996 | Ehrnsberger et al. | |
| 5,595,268 A | 1/1997 | Paton | |
| 5,720,369 A | 2/1998 | Thorn | |
| 6,199,708 B1 * | 3/2001 | Monaco | 213/43 |
| 6,443,437 B1 * | 9/2002 | Beyene et al. | 267/64.26 |
| 2002/0066629 A1 * | 6/2002 | Muller | 188/380 |

FOREIGN PATENT DOCUMENTS

| | | |
|---|---|---|
| DE | 1809968 | 7/1970 |
| DE | 2406144 | 8/1975 |
| DE | 2942716 | 5/1981 |
| EP | 0485647 A1 | 5/1992 |
| FR | 1.316.622 | 2/1963 |
| GB | 1543712 | 4/1979 |
| JP | 54-158579 | 12/1979 |

* cited by examiner

*Primary Examiner*—Devon Kramer
(74) *Attorney, Agent, or Firm*—Wenderoth, Lind & Ponack, L.L.P.

(57) ABSTRACT

A braking and damping device for movable pieces of furniture has a fluid-cylinder (1) in which two pistons (2, 5) are arranged in a linearly displaceable manner. One of the pistons (2) is displaceable by a piston rod (3). Arranged between the two pistons (2, 5) is an elastically deformable sealing member, which, when damping occurs, is deformed by being squeezed between the two pistons (2, 5) and pressed against a cylinder wall (7).

29 Claims, 8 Drawing Sheets

BRAKING- AND DAMPING DEVICE, IN PARTICULAR FOR MOVABLE PIECES OF FURNITURE

BACKGROUND OF THE INVENTION

The invention relates to a braking and damping device, in particular for movable pieces of furniture, having a fluid-cylinder in which two pistons are arranged in a linearly displaceable manner, wherein a piston is displaceable over a piston rod.

With modern furniture, braking and damping devices are being used increasingly in order to prevent a door of a piece of furniture which is slammed shut too forcefully or a drawer which is pushed into a furniture frame with too much force from hitting the end wall of the furniture frame. The oldest damping devices were formed from simple rubber buffers. More recently, pneumatic and hydraulic braking- and damping devices have been used.

In the case of drawers, they are preferably combined with a drawing-in device. Also, doors or flaps are in many instances provided with hinges which have a closure mechanism, which is then responsible, together with the damping device, for an optimum course of movement.

In the case of fluid damping devices, i.e. pneumatic or hydraulic damping devices with a linearly movable piston, it has been seen that with high speeds or large volumes, the damping effect of the fluid is insufficient to brake the moving piece of furniture adequately.

U.S. Pat. No. 4,877,226 therefore proposed a fluid damping device with a linearly movable piston wherein the piston radially expanded during the damping operation and pressed against the cylinder wall, so that in addition to the damping effect caused by the fluid, frictional damping occurred between the cylinder and piston.

SUMMARY OF THE INVENTION

The aim of the present invention is to create a pneumatic or hydraulic braking and damping device of the kind mentioned in the introduction, wherein improved sealing between the piston and cylinder wall is achieved, and wherein spring-back during braking by a cushion of air, or cushion of fluid, occurring in the cylinder is avoided.

The problem of the invention is solved in that an elastically deformable sealing member is arranged between the two pistons, which, when damping occurs, is deformed by being squeezed between the two pistons and pressed against the cylinder wall.

Advantageously, it is provided that the piston, which is displaceable linearly by a piston rod, has an open cavity at the front face thereof into which a second piston is introduced. The second piston is mounted in the first piston in a freely displaceable manner, and, on the outer casing, has an annular projection which is disposed in front of the first piston. Arranged between the annular projection and the front face of the first piston is a sealing member, which is in the form of a sealing ring.

Advantageously, it is further provided that abutments are provided in the cavity of the first piston which delimit the path of displacement of the second piston.

One embodiment of the invention provides for at least one elastic spacer to be provided between the floor of the cavity of the first piston and the rear side of the second piston.

Another embodiment of the invention provides for the sealing member to be designed as a cylindrical solid body made from a rubber elastic material or as a cylindrical bellows. The cylindrical shape exists therein in the unloaded state. When loaded, the sealing member becomes compressed and deformed.

BRIEF DESCRIPTION OF THE DRAWINGS

There will now follow a description of various embodiments of the invention with the aid of the accompanying drawings, wherein.

DETAILED DESCRIPTION OF THE PREFERRED EMBODIMENTS

Figure 1:
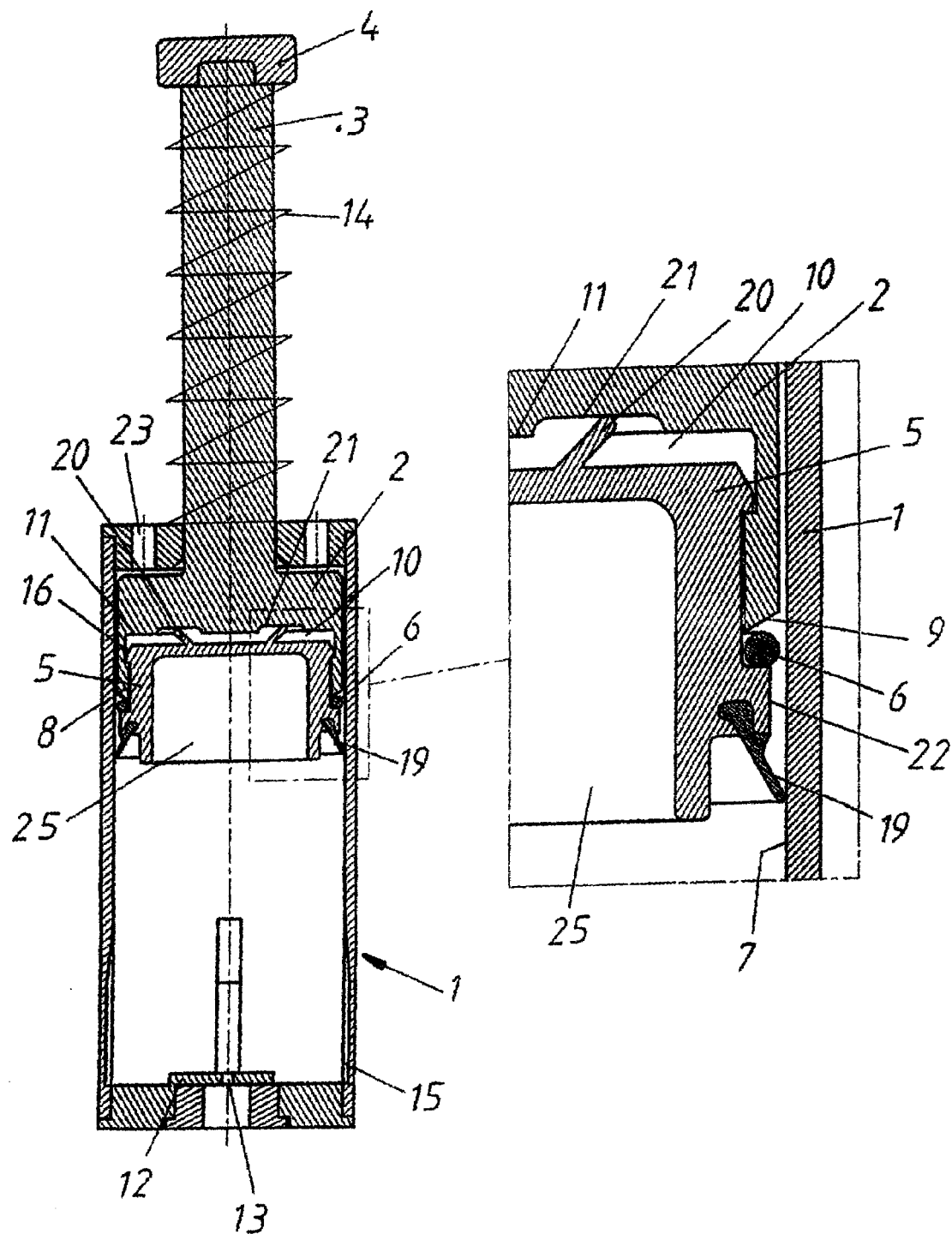
FIG. 1 shows a longitudinal section through pistons and the cylinder of a braking and damping device according to the invention, in a ready position, FIG. 2 and FIG. 3 each show a longitudinal section through the pistons and the cylinder of FIG. 1, wherein the pistons are shown during a braking path.
Figure 2:
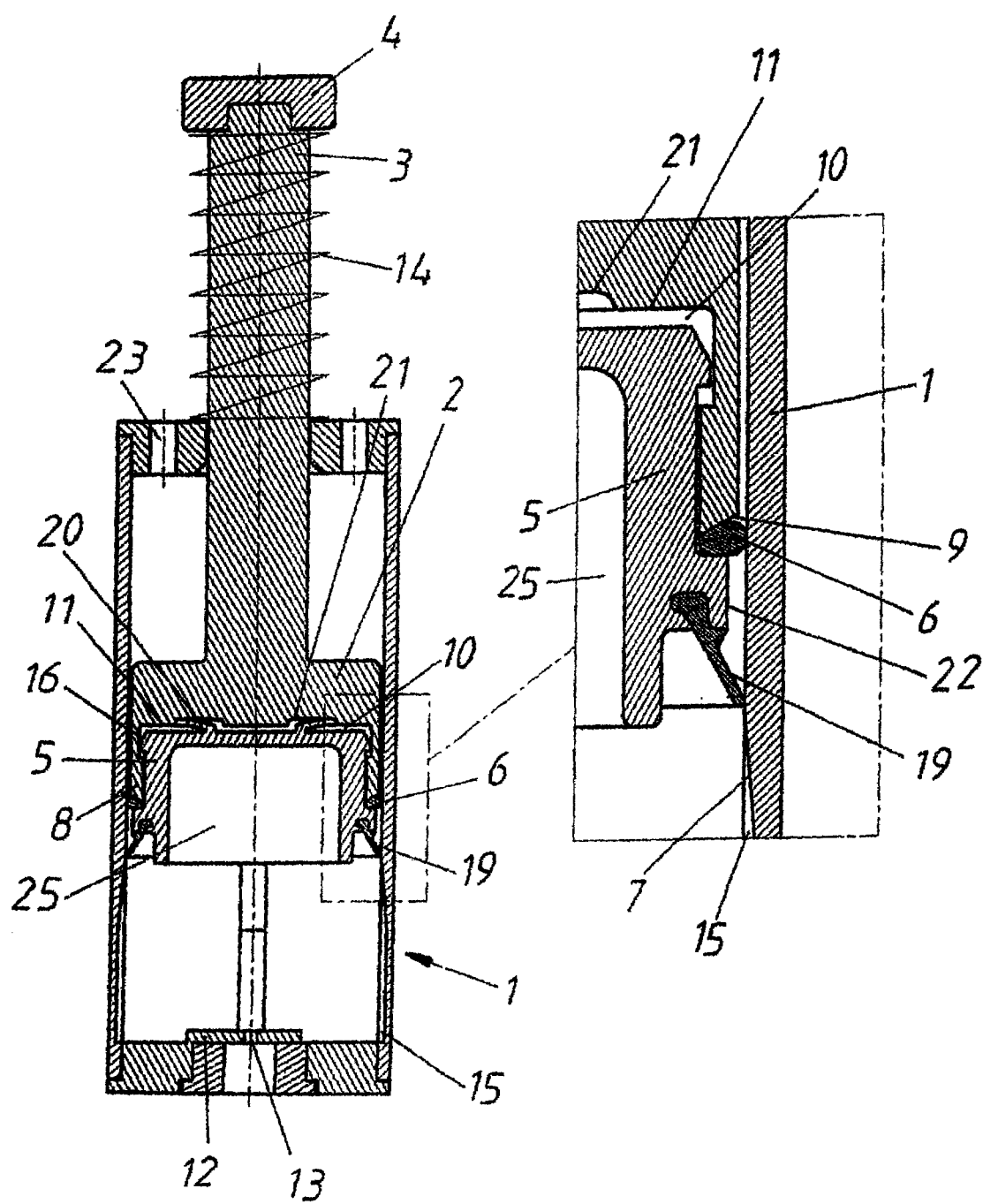
Figure 3:
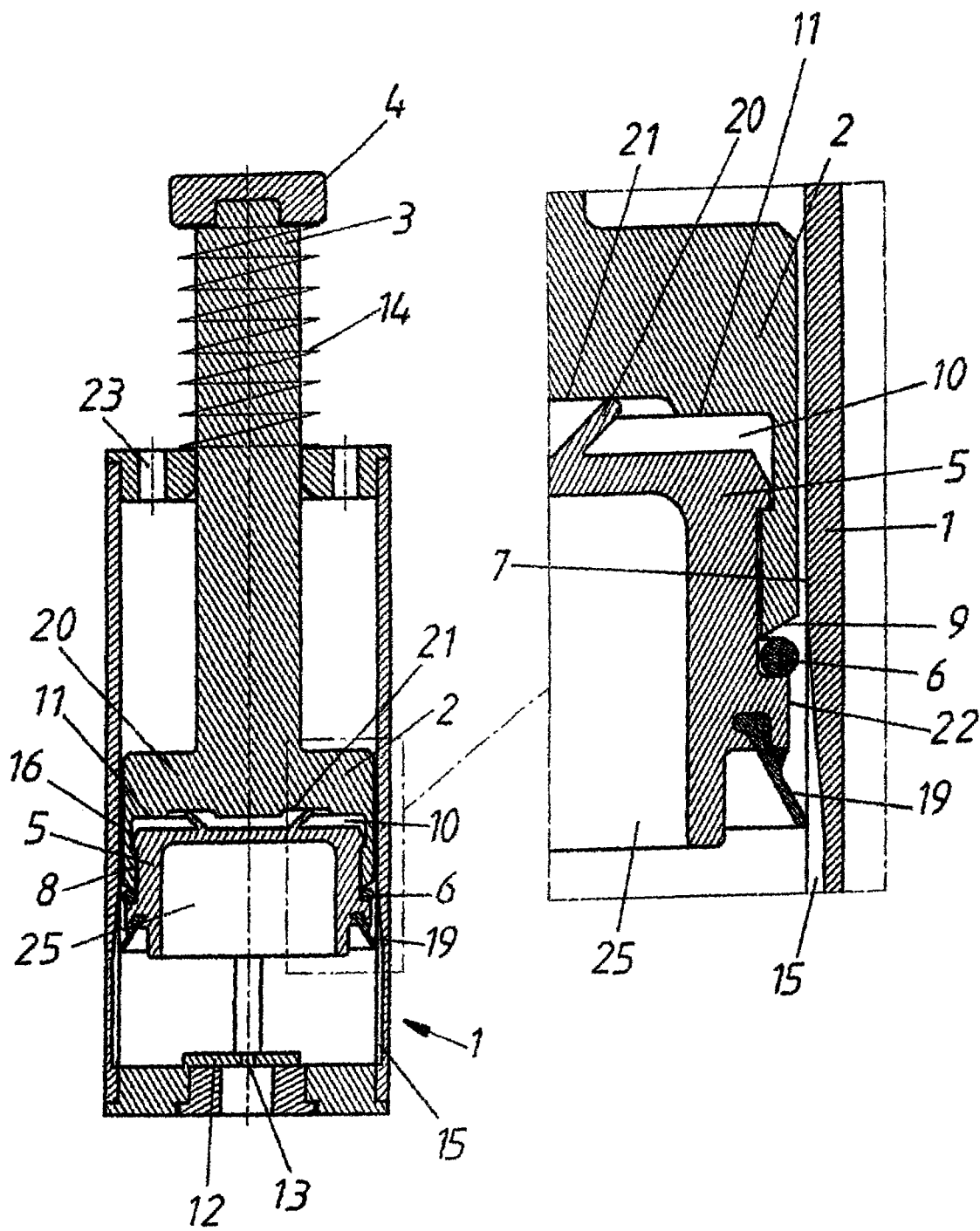
Figure 4:
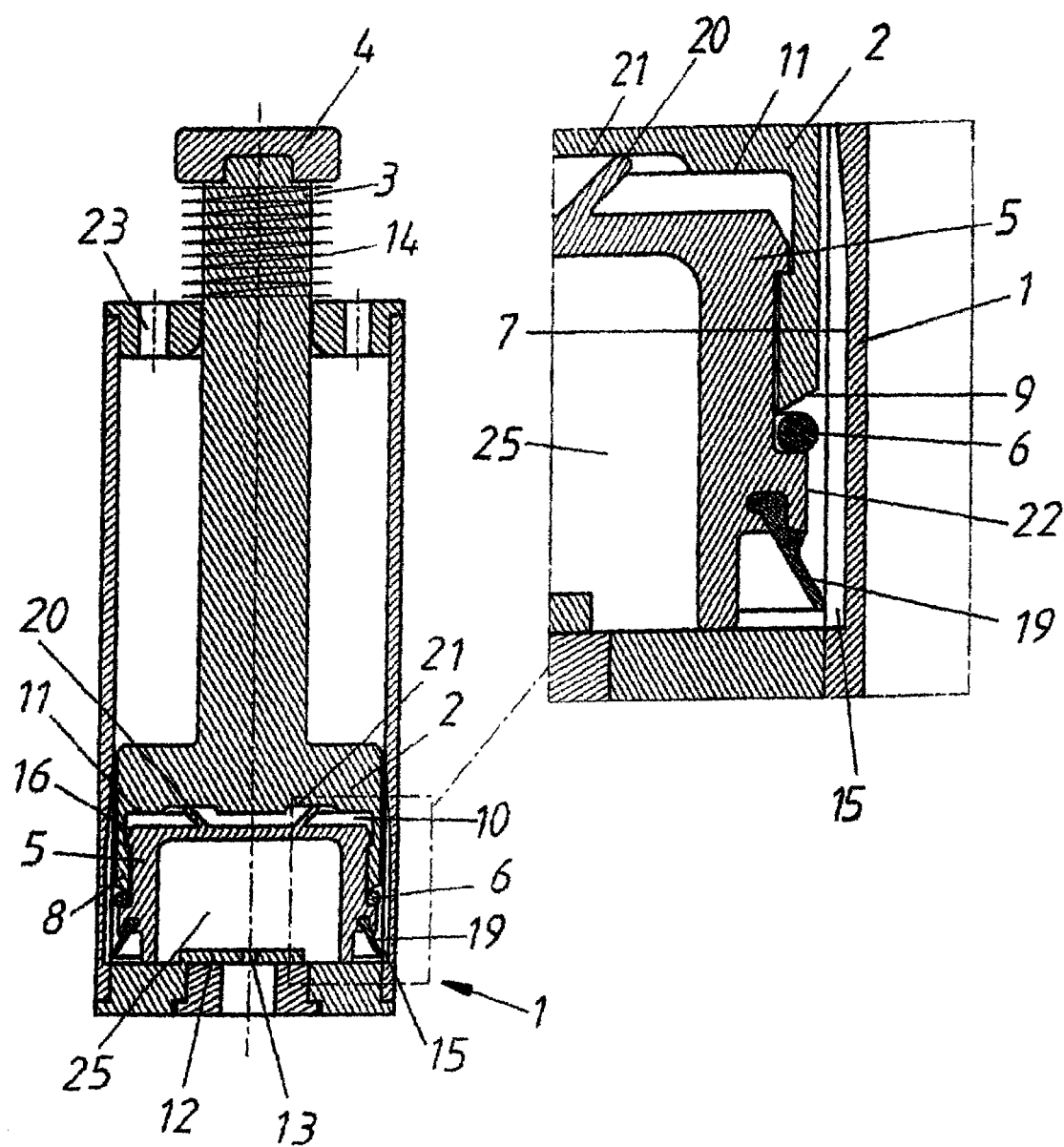
FIG. 4 shows a longitudinal section through the pistons and the cylinder, wherein the pistons are shown at an end of the braking path.
Figure 5:
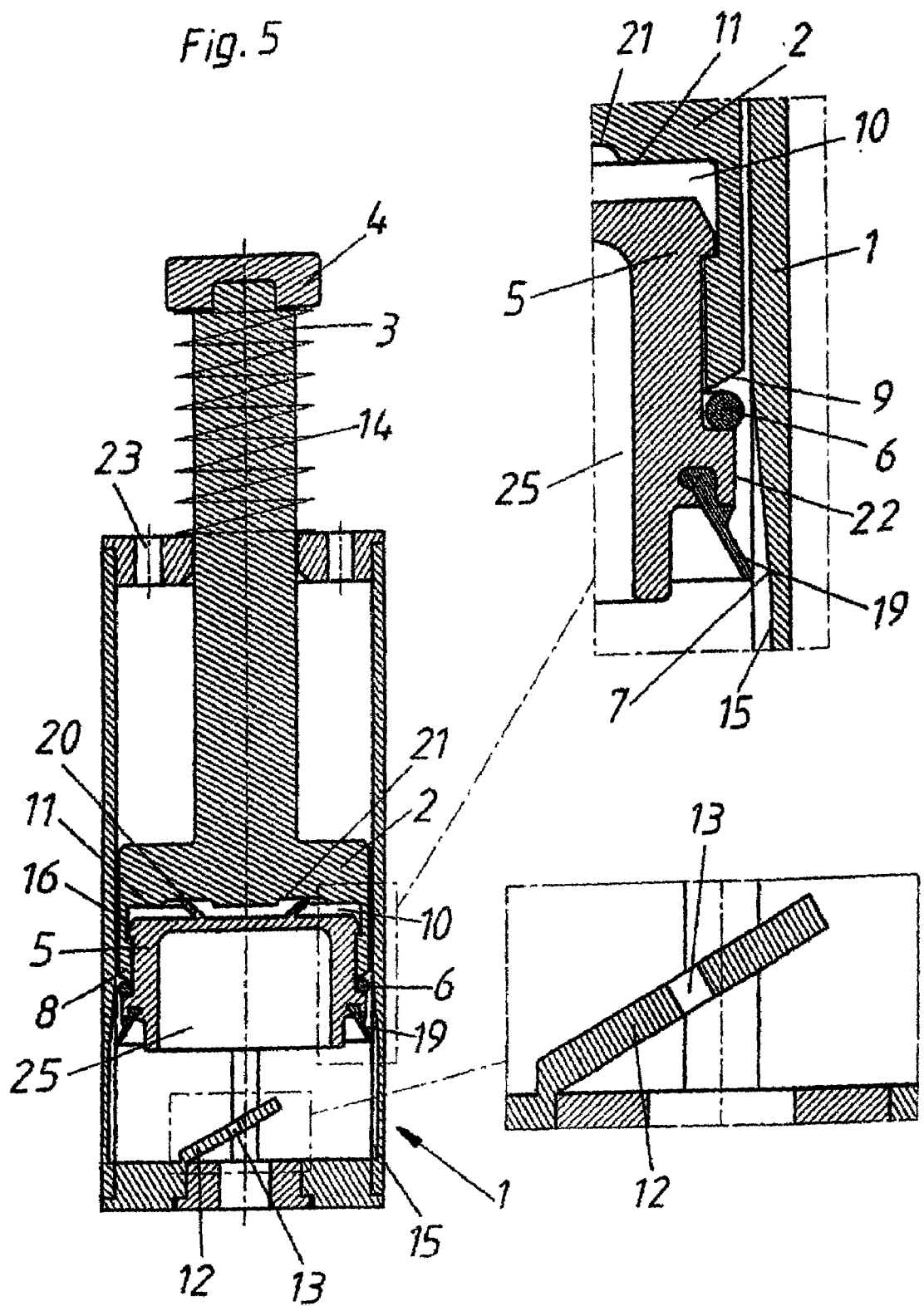
FIG. 5 shows a longitudinal section through the pistons and the cylinder, wherein the pistons are shown in a restoring phase.

A braking and damping device according to the invention has a cylinder 1 in which a piston 2 is arranged in a linearly displaceable manner. The piston 2 is provided with a piston rod 3. The piston rod 3 forms a plunger which is preferably acted upon by the movable piece of furniture. By way of example, the cylinder 1 maybe secured to the side wall of a piece of furniture, or to the top or floor of a piece of furniture, and in such a way that a closed door or end panel of a closed drawer abuts on the head 4 of the piston rod 3.

In the embodiment according to FIGS. 1 to 5, the piston 2 is provided with an open cavity 10 in the front face thereof, into which cavity a second piston 5 is inserted.

The first piston 2 has an annular projection 8, the inside of which acts as an abutment for delimiting the path of the second piston 5. During relative rearward movement of the piston 5, an abutment is formed by the floor 11 of the cavity 10 in the piston 2.

The piston 5 is likewise provided with an annular projection 16 which forms a counter-abutment which, when the piston 5 is disposed in the frontmost position in relation to the piston 2, rests upon the annular projection 8.

The piston 5 may be made of a plastics material, for example. Formed on the rear side of the piston 5 is at least one spacer 20 which bears in at least one recess 21 in the floor of the cavity 10 in the piston 2.

A front face 9 of the first piston 2 is inclined and extends radially outward inclined to the rear, as viewed with respect to the cylinder wall 7.

A ready position of the braking and damping device is shown in FIG. 1. The pistons 2, 5 are disposed at the upper end of the cylinder 1. The term, "upper" is used here in relation to the drawings.

The piston 5 is held by the spacer 20 at a spacing from the floor 11 of the cavity 10. A sealing member, which is in the form of a sealing ring 6, is disposed with a certain clearance between the front face 9 of the piston 2 and an annular projection 22 of the piston 5. If a door of a piece of furniture or an end panel of a drawer strikes the head 4 of the piston rod 3, the pistons 2, 5 are pushed down in the cylinder, and, as can be seen from FIG. 2, the spacer 20 is pushed down. When this happens, the sealing ring 6 is squeezed, deformed in cross-section, and pressed against the inner wall 7 of the cylinder 1.

The cylinder wall 7 is provided with axially extending ribs 15 which permit the passage of air when the piston 2 is disposed in the frontmost position. In so doing, the pistons 2, 5 become pressed apart by the spacer 20 (see FIG. 4).

The piston 5 is provided with a skirt 19, consisting of a rubber-like or elastomer material, which preferably skims the inner wall 7 of the cylinder 2.

The cylinder 1 has air intake openings 23 on the rear side of the piston 2 and a return valve 12 with a discharge opening 13 on the front side. During damping, air is only able to escape slowly through the relatively small opening 13. When the pistons 2, 5 are withdrawn by the spring 14, i.e. are returned to the ready position, the return valve 12 opens and air, or another fluid, is able to flow unhindered into the cylinder 1.

In the embodiment shown, the second piston 5 is also provided with a cavity 25 which is open towards the front.

In the embodiments shown in FIGS. 6 to 10, an elastically deformable sealing member is also arranged between the pistons 2, 5.

Figure 7:
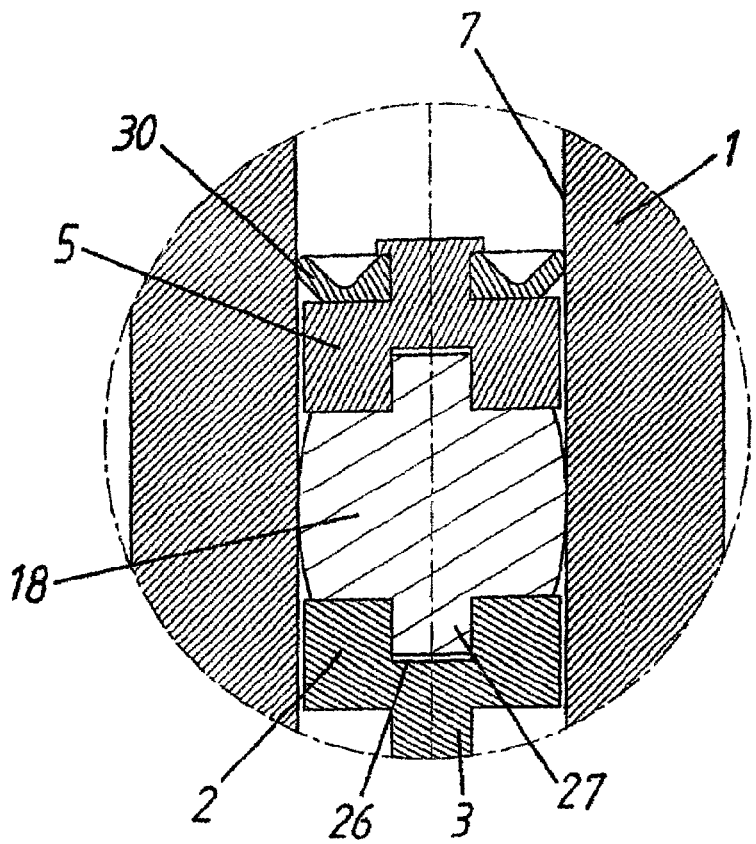
FIG. 7 shows section A of FIG. 6, wherein a piston is shown in a damping position.
Figure 9:
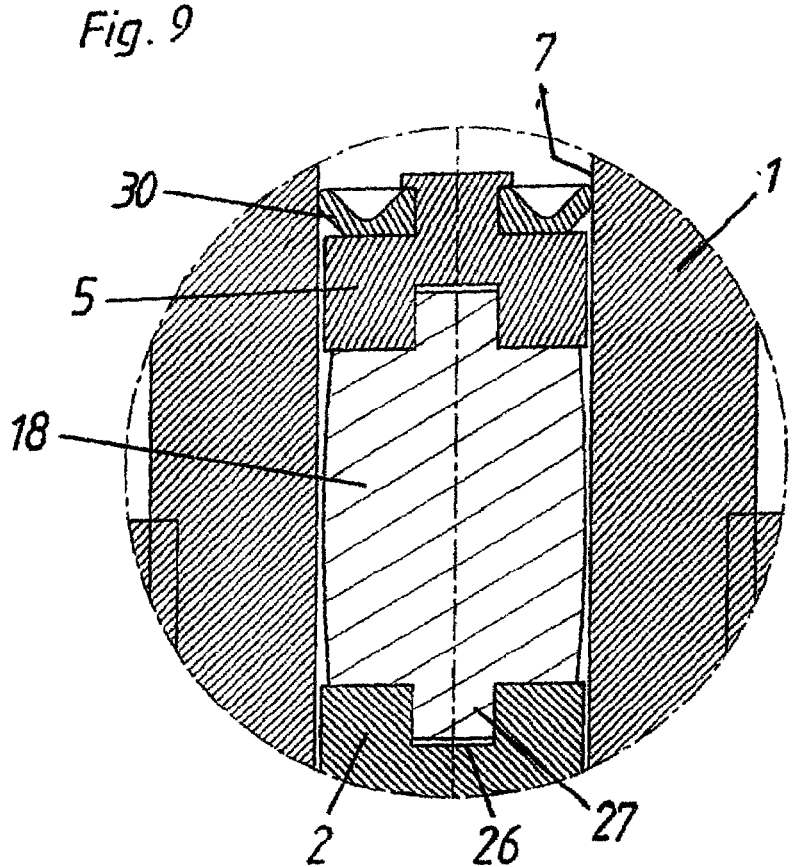
FIG. 9 shows the same cut-out section as FIG. 7, wherein the piston is shown in a ready, or restoring, position.

In the embodiment according to FIGS. 7 and 9, the elastically deformable sealing member is formed by a solid body 18 consisting of rubber elastic material. This solid body 18 has projections 27 by means of which it is anchored in recesses 26 in the piston 2.

During the damping operation, i.e. when the piston 2 is being pressed into the cylinder 1 by the piston rod 3, the solid body 18, as shown in FIG. 7, is compressed between the piston 2 and the piston 5 and pressed against the cylinder wall 7, whereby, in addition to the damping caused by the fluid, damping caused by friction takes place.

The piston 2 is provided with a seal 30 which bears against the cylinder wall 7. As a result, the resistance to fluid in the cylinder 1 is increased.

Figure 8:
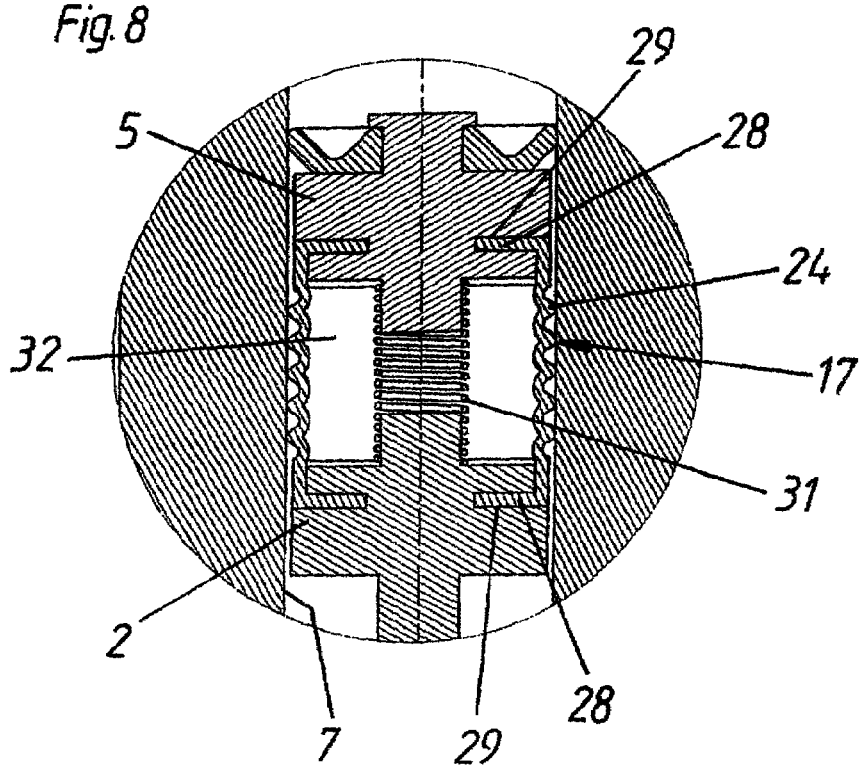
FIG. 8 shows section A of FIG. 6, wherein another embodiment of a piston is shown in the damping position.
Figure 10:
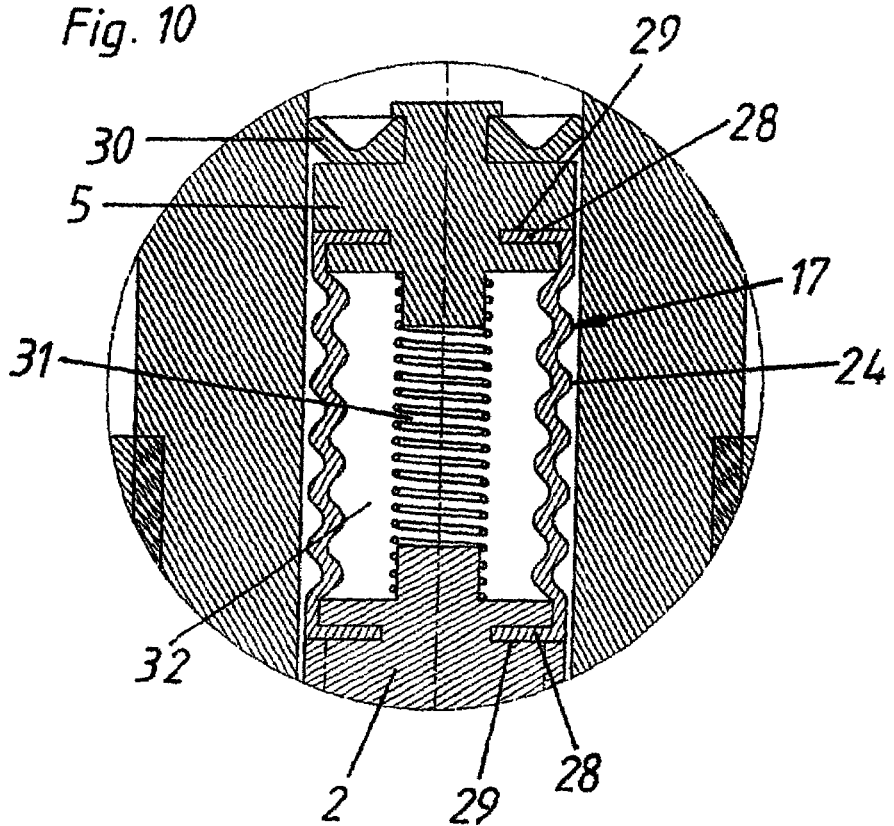
FIG. 10 shows the same cut-out section as FIG. 8, wherein the piston is shown, once again, in the ready, or restoring, position.

In the embodiment according to FIGS. 8 and 10, a bellows 17 is provided instead of a solid body 18. The bellows 17 has angled edges 28 by means of which it is anchored in slots 29 in the pistons 2, 5.

Figure 6:
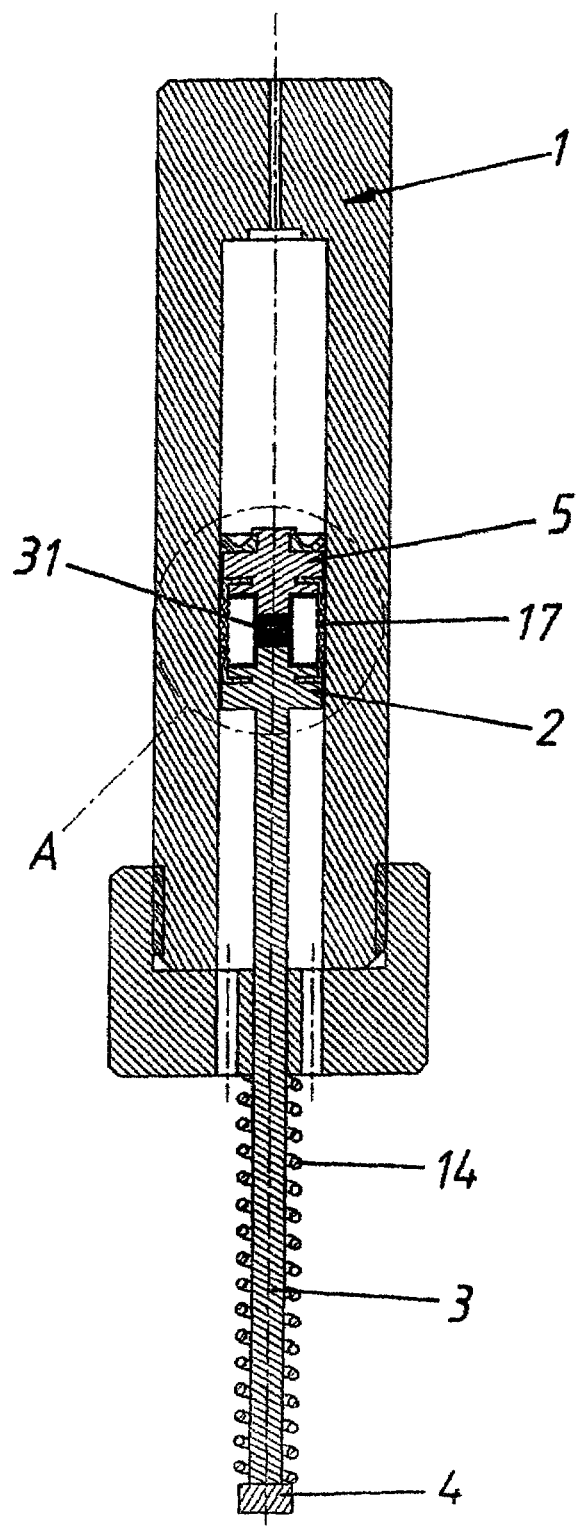
FIG. 6 shows a longitudinal section through a cylinder piston unit according to another embodiment of the invention.

In the embodiment shown in FIGS. 6, 8 and 10, a compression spring 31 is provided between the pistons 2, 5 which pushes the pistons 2, 5 apart again after damping has occurred. A cavity 32 is surrounded by the bellows 17 and can contain a hydraulic fluid, e.g. oil. The outer side of the bellows 17 is provided with annular ribs 24 which improve adhesion of the bellows 27 to the cylinder wall 7.

During the damping process, the pistons 2, 5 are compressed, as shown in FIG. 8, and the bellows 17 is pressed with greater intensity against the cylinder wall 7, giving rise to the effect of additional damping caused by friction.

The damping device according to the invention is preferably designed as a pneumatic damping device. However, it could also be implemented in the form of a hydraulic damping device.

The invention claimed is:

1. A braking and damping device, comprising:
   a fluid cylinder having a cylinder wall;
   two pistons that are arranged so as to be linearly displaceable relative to one another in said fluid cylinder;
   a piston rod for displacing one of said two pistons in said fluid cylinder; and
   an elastically deformable sealing member arranged between said two pistons such that when damping occurs by said piston rod displacing the one of said two pistons in said fluid cylinder, said elastically deformable sealing member is squeezed between said two pistons by said displacement of the one of said two pistons relative to the other of said two pistons and pressed against said cylinder wall.

2. The braking and damping device of claim 1, wherein the one of said two pistons has an open cavity at a front face thereof into which a second of said two pistons is introduced, the second of said two pistons is mounted in said first piston in a freely displaceable manner, the second of said two pistons has an outer casing with an annular projection disposed in front of the one of said two pistons, and said sealing member is arranged between said annular projection and said front face of the one of said two pistons.

3. The braking and damping device of claim 2, wherein said front face of the one of said two pistons is inclined rearwardly from the second of said two pistons towards said cylinder wall of said cylinder.

4. The braking and damping device of claim 2, wherein said cavity of the first of said two pistons has abutments which delimit a displacement path of the second of said two pistons.

5. The braking and damping device of claim 2, wherein the second of said two pistons comprises an annular skirt.

6. The braking and damping device of claim 5, wherein said skirt comprises a rubber elastic material.

7. The braking and damping device of claim 5, wherein said skirt is arranged to skim over said cylinder wall of said cylinder during movement of the second of said two pistons in said cylinder.

8. The braking and damping device of claim 2, wherein at least one elastic spacer is provided between a floor of said cavity of the first of said two pistons and a rear side of the second of said two pistons.

9. The braking and damping device of claim 8, wherein the second of said two pistons is made of plastic material and said at least one elastic spacer is formed on said rear side of the second of said two pistons.

10. The braking and damping device of claim 8, wherein at least one recess is provided in said floor of said cavity for said at least one elastic spacer.

11. The braking and damping device of claim 1, wherein said cylinder wall comprises axially extending grooves positioned so as to permit passage of a pneumatic medium when said two pistons are disposed in a front end position of said cylinder.

12. The braking and damping device of claim 11, wherein the pneumatic medium is air.

13. The braking and damping device of claim 1, wherein said sealing member comprises a solid body made of a rubber elastic material that connects said two pistons.

14. The braking and damping device of claim 13, wherein said two pistons have recesses in front faces thereof and said sealing member has projections received in said recesses.

15. The braking and damping device of claim 1, wherein said elastically deformable sealing member comprises a cylindrical bellows.

16. The braking and damping device of claim 15, wherein said cylindrical bellows has a plurality of peripherally extending ribs which lie sealingly against said cylinder wall.

17. The braking and damping device of claim 15, wherein said bellows contains hydraulic fluid.

18. The braking and damping device of claim 15, wherein said bellows is anchored with a positive fit in said two pistons.

19. The braking and damping device of claim 1, wherein a compression spring is inserted in between said two pistons.

20. A braking and damping device, comprising:
a fluid cylinder having a cylinder wall;
two pistons that are arranged so as to be linearly displaceable in said fluid cylinder;
a piston rod for displacing one of said two pistons in said fluid cylinder; and
an elastically deformable sealing member arranged between said two pistons such that when damping occurs by said piston rod displacing the one of said two pistons in said fluid cylinder, said elastically deformable sealing member is squeezed between said two pistons and pressed against said cylinder wall;
wherein a second of said two pistons comprises a seal which seals with said cylinder wall of said cylinder.

21. A braking and damping device for a piece of furniture, comprising:
a fluid cylinder having a cylinder wall, said fluid cylinder being mounted on the piece furniture;
two pistons that are arranged so as to be linearly displaceable in said fluid cylinder;
a piston rod for displacing one of said two pistons in said fluid cylinder, said piston rod being positioned so as to be engageable by a movable part of the piece of furniture; and
an elastically deformable sealing member arranged between said two pistons such that when damping occurs by said piston rod displacing the one of said two pistons in said fluid cylinder, said elastically deformable sealing member is squeezed between said two pistons and pressed against said cylinder wall.

22. A braking and damping device, comprising:
a fluid cylinder having a cylinder wall;
a first piston and a second piston that are arranged so as to be linearly displaceable in said fluid cylinder along an axis;
a piston rod for displacing said first piston in said fluid cylinder;
wherein said second piston is disposed opposite to said first piston and has a seal sealing said second piston with respect to said cylinder wall;
an elastically deformable friction braking member arranged between said first piston and said second piston such that when damping occurs by said piston rod displacing said first piston in said fluid cylinder, said elastically deformable friction braking member is deformed by being squeezed between said first piston and said second piston and pressed against said cylinder wall so as to cause damping caused by friction in addition to damping caused by fluid damping.

23. The braking and damping device of claim 22, wherein said cylinder wall comprises axially extending grooves to permit passage of fluid of said fluid cylinder when said first piston and said second piston are disposed in a front end position in said cylinder.

24. The braking and damping device of claim 22, wherein said friction braking member is in the form of a solid body manufactured from a rubber elastic material which connects said first piston and said second piston.

25. The braking and damping device of claim 24, wherein said first piston and said second piston each have recesses in front faces thereof and said friction braking member has projections received in said recesses.

26. The braking and damping device of claim 22, wherein said cylinder is structured and arranged to employ a pneumatic medium as an operating fluid.

27. The braking and damping device of claim 22, wherein said cylinder is structured and arranged to employ air as the operating fluid.

28. The braking and damping device of claim 22, wherein said friction braking member is a single body, the material of which is squeezed between said first piston and said second piston.

29. The braking and damping device of claim 22, wherein said first piston and said second piston are made of a rigid material.

* * * * *

UNITED STATES PATENT AND TRADEMARK OFFICE
Certificate

Patent No. 7,100,907 B2                                               Patented: September 5, 2006

On petition requesting issuance of a certificate for correction of inventorship pursuant to 35 U.S.C. 256, it has been found that the above identified patent, through error and without any deceptive intent, improperly sets forth the inventorship.
  Accordingly, it is hereby certified that the correct inventorship of this patent is: Helmut Fitz, Lustenau (AT); Klaus Brüstle, Höchst (AT); and Krammer Bernhard, Höchst (AT).

Signed and Sealed this Twenty-fifth Day of November 2014.

*ROBERT SICONOLFI*
*Supervisory Patent Examiner*
*Art Unit 3657*
*Technology Center 3600*